United States Patent [19]

Stephenson

[11] Patent Number: 4,605,187
[45] Date of Patent: Aug. 12, 1986

[54] WING FLAP MECHANISM

[75] Inventor: Martin F. Stephenson, Issaquah, Wash.

[73] Assignee: The Boeing Company, Seattle, Wash.

[21] Appl. No.: 588,161

[22] Filed: Mar. 9, 1984

[51] Int. Cl.⁴ .............................................. B64C 9/18
[52] U.S. Cl. ................................................... 244/216
[58] Field of Search ..................... 244/215, 216, 218

[56] References Cited

U.S. PATENT DOCUMENTS

| | | | |
|---|---|---|---|
| 2,608,364 | 8/1952 | Gordon et al. | 244/216 |
| 2,661,166 | 12/1953 | Gordon | 244/216 |
| 4,120,470 | 10/1978 | Whitener | 244/216 |
| 4,248,395 | 2/1981 | Cole | 244/216 |

FOREIGN PATENT DOCUMENTS

931250  2/1948  France ................. 244/216

Primary Examiner—Galen L. Barefoot
Attorney, Agent, or Firm—H. Gus Hartmann; B. A. Donahue

[57] ABSTRACT

A carrier unit for chordwise extending and rotatably positioning an auxiliary airfoil mounted adjacent to the trailing edge of a relatively fixed main airfoil of an airplane. When the auxiliary airfoil is in a fully retracted and stowed position, the actuation and positioning linkage mechanism of the carrier unit is completely housed within the combined auxiliary and main airfoil envelope with no external protrusions or fairings. For auxiliary airfoil extension, to increase the overall chord plane by approximately eight percent, a first set of four-bar linkages is utilized comprising: a beam member supported at a forward portion by a pair of approximately parallel links pivoted to wing structure and swingable chordwise in a generally parallel relationship for translatably shifting the auxiliary airfoil which is pivoted to a rearward portion of the beam member. For changing the auxiliary airfoil angle-of-incidence relative to the main airfoil, one or more sets of four-bar linkages are integrated with the first set for a unified rotation programming and extension drive that functions to produce an aerodynamic slot opening when the auxiliary airfoil is extended to takeoff and landing positions whereat it is deflected up to approximately forty degrees relative to the main airfoil reference chord plane. For an aerodynamic braking action during landing roll-out, the geometrical relationship of the sets of four-bar linkages functions to deflect the auxiliary airfoil chord plane greater than forty degrees, to approximately ninety degrees or more relative to the main airfoil reference chord plane.

7 Claims, 12 Drawing Figures

WING FLAP MECHANISM

SUMMARY OF THE INVENTION

The present invention relates to a flap extension or retraction mechanism and more particularly, to integrated sets of four-bar linkages; wherein, a first set translates a beam member which supports a flap panel or segment and the other set or sets, programs the angle-of-incidence change of the flap segment relative to the fixed wing chord plane.

Conventional trailing edge flap support and extension systems, e.g., track and roller mechanisms, generally require large external fairings for mechanisms that protrude into the airstream in order to reduce a drag penalty produced thereby.

The thickness of the wing airfoil section generally limits the installation area so that most known flap support and extension systems which are compacted into the trailing edge volume of a relatively thin airfoil, have the disadvantage of restrictive flap extension distance and limited angle-of-incidence deflection range.

The integrated sets of four-bar linkages of the present invention enable the linkage mechanism to operate freely throughout the complete extension and retraction cycle, and provide a uniform mechanical advantage throughout its operation. The linkage mechanism produces good aerodynamic characteristics, i.e., in terms of aerodynamic slot geometry and deployment schedule, without producing additional drag by protrusion of the wing airfoil envelope and the external fairings. However, it will be understood that the linkage geometry could be changed to produce a greater mechanical advantage, but with the results of external protrusion of the wing airfoil envelope and the disadvantage of cruise drag from the added fairings. Further, it is possible that an optimum flap system linkage arrangement may be derived by trading weight reduction due to improved mechanical efficiency against the cruise drag produced by the external fairings.

An object of the invention is to provide a flap extension and deflection mechanism which can be completely contained within the confines of the wing airfoil envelope, when the flap is retracted, with non-existant fairing protrusions to provide minimum aerodynamic cruise drag.

Another object is to substantially increase the overall wing chord plane area by extending the flap approximately eight percent of the local wing chord length for a landing position.

Another object is to provide an integrated flap extension and flap rotation mechanism that will simultaneously program flap angle-of-incidence setting relative to the local wing chord plane, and also extend the flap approximately eight percent of local wing chord length for both a landing and a takeoff position, while producing an aerodynamically optimum arrangement.

Another object is to provide aerodynamic braking for the airplane during the ground roll after landing by increasing the flap deflection angle to approximately 90° (ninety degrees) to the wing chord plane.

Another object is to provide thrust reversal action for aerodynamic braking of the airplane during landing roll-out by increasing the flap deflection angle greater than ninety degrees and positioning it in the efflux flow from a high bypass turbofan engine which is pylon mounted from the wing undersurface.

DESCRIPTION OF THE PREFERRED EMBODIMENTS

Figure 1:
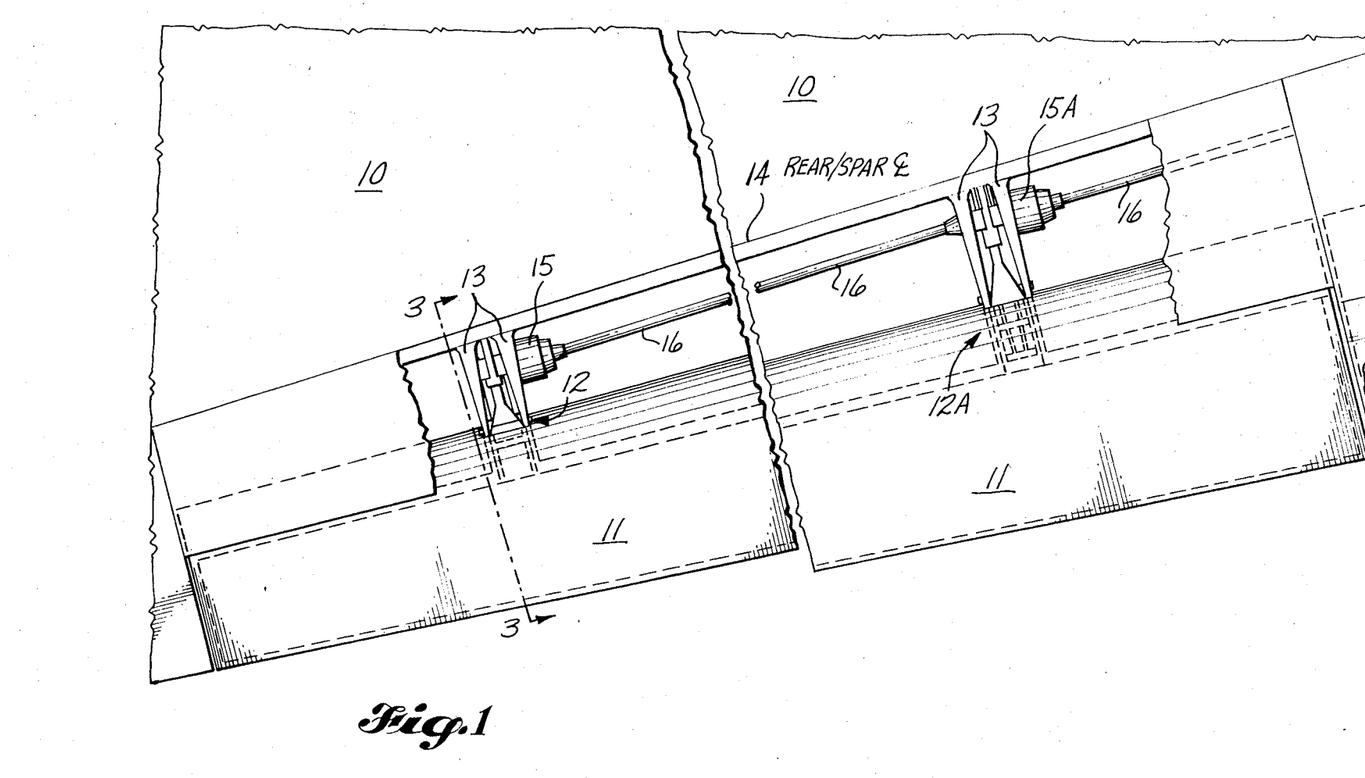
FIG. 1 is a top plan view of an airplane tapered wing section depicting a trailing edge flap segment or panel in a retracted and stowed position.

FIG. 1 is a top plan view of an airplane tapered wing section 10 showing a trailing edge flap segment 11 in a retracted position. The flap segment 11 is supported by a pair of spanwise separated flap carrier units: 12 outboard and 12A inboard. Each of the flap carrier units 12 and 12A, is centered between a pair of wing trailing edge ribs 13 which serve as structural support; and the wing ribs 13 are secured to a spanwise structural member such as a rear wing spar 14. The difference in size of the flap carrier units 12, 12A, is due to a tapered wing planform having a tapered flap segment 11; and the flap carrier units 12, 12A, are geometrically scaled, either up or down, depending on their spanwise location. The larger flap carrier unit 12A is located at the inboard station of the tapered flap segment 11 and will in effect, move the flap segement 11 further than the small flap carrier unit 12 outboard; thereby, producing a conical extension of the flap segment 11; and this will also produce a slight change in the spanwise length between these two flap carrier units, which will be accommodated by fixing the inboard unit 12A, having spherical or monoball joints, to carry the side or spanwise loads of the flap segment, and modifying the outboard unit 12, also having monoball joints, such that the monoballs slide on a retaining pin or bolt. This arrangement and modification of the ball-joints will accommodate the rack type movement of the flap segment 11, i.e., its conical or non-parallel chordwise movement about some radial center point outboard of the wing tip.

The power drive system for flap extension or retraction, comprises: a pair of reduction gear boxes, hereinafter referred to as rotary actuators, 15 outboard and 15A inboard, driven via interconnecting high speed torque drive tubes or shafts 16, by an hydraulic or electric power drive unit centrally located in the airplane. The housing for each of the rotary actuators 15, 15A, is securely mounted to one side of a wing rib 13 outboard of and adjacent to each of the flap carrier units 12, 12A respectively.

In general, trailing edge flaps are a relatively complex problem because they are usually a multi-position operation with or without a slot in extended positions.

The present invention has flap carrier units 12, 12A, that produce a simultaneously combined translation and rotation of the flap segment 11, as opposed to separate staging operations of aft translation and downward deflection; and this unified programming of flap extension and deflection, produces an aerodynamically optimum arrangement of the flap/wing combination. Also, when the flap segment 11 is at an extended position, as shown in FIG. 4, an aerodynamic opening or slot 17 is formed between the nose of the flap 11 and the trailing edge of the fixed wing portion.

Figure 2:
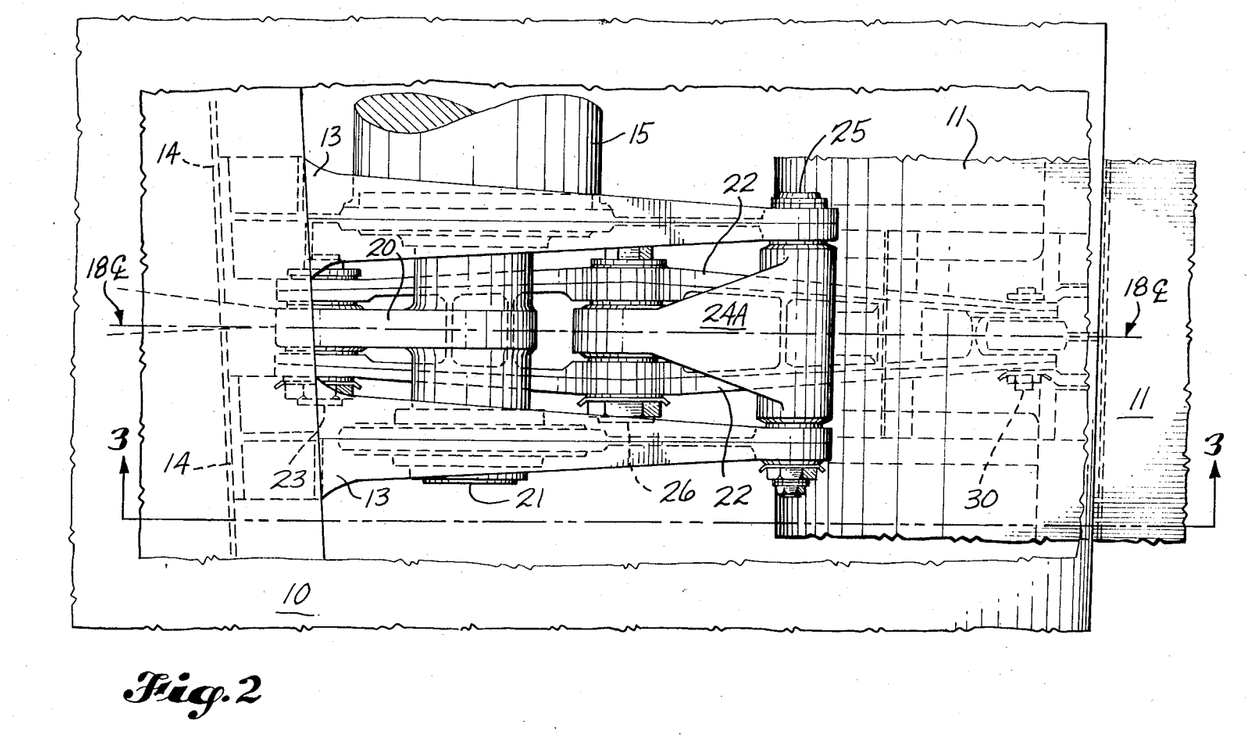
FIG. 2 is an enlarged top plan view of an outboard flap drive mechanism shown in FIG. 1.

FIG. 2 is an enlarged top plan view of the outboard flap carrier unit 12, shown in FIG. 1. For structural efficiency, the linkage mechanism for each of the flap carrier units 12, 12A, is designed to be symmetrical about the support centerline 18 in order to avoid load offsets which would induce torsion into the linkage mechanism.

Figure 3:
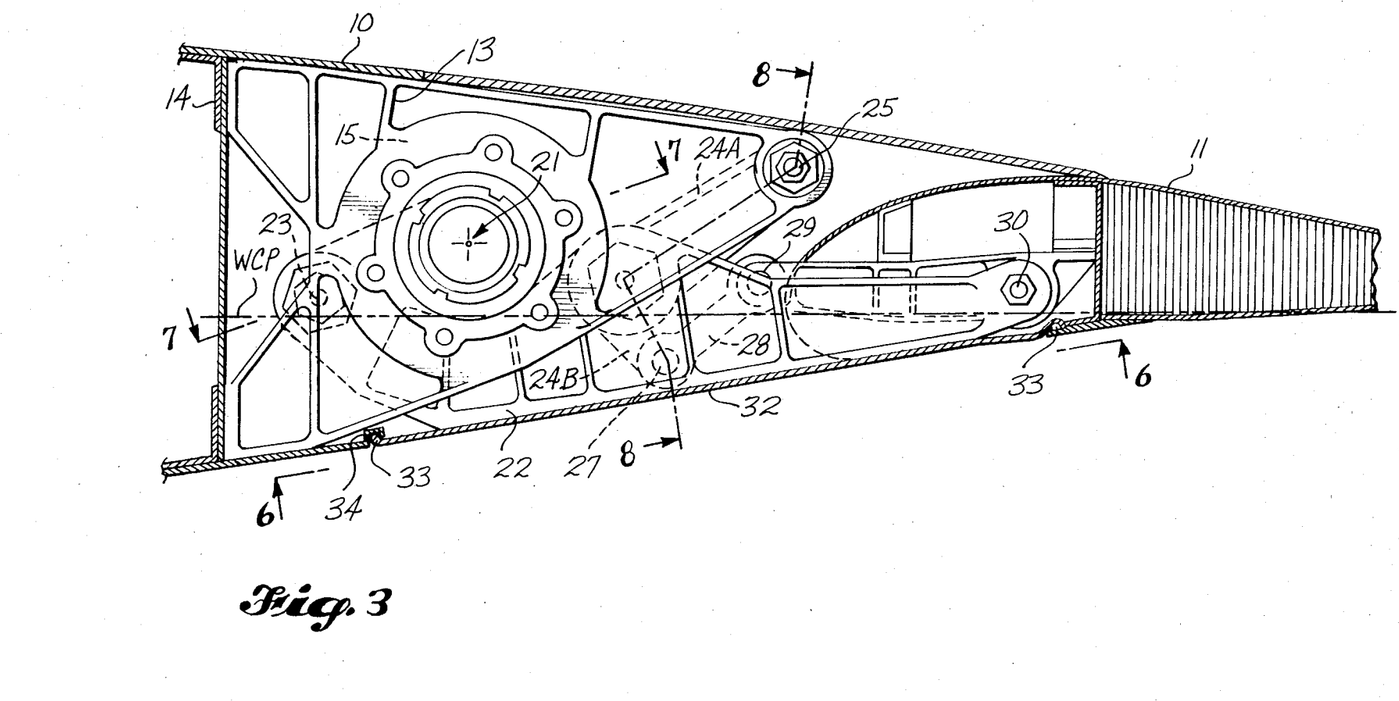
FIG. 3 is a cross-sectional view taken in the direction indicated by the line 3—3 of FIGS. 1 and 2, showing the trialing edge flap segment in a fully retracted and stowed position.
Figure 4:
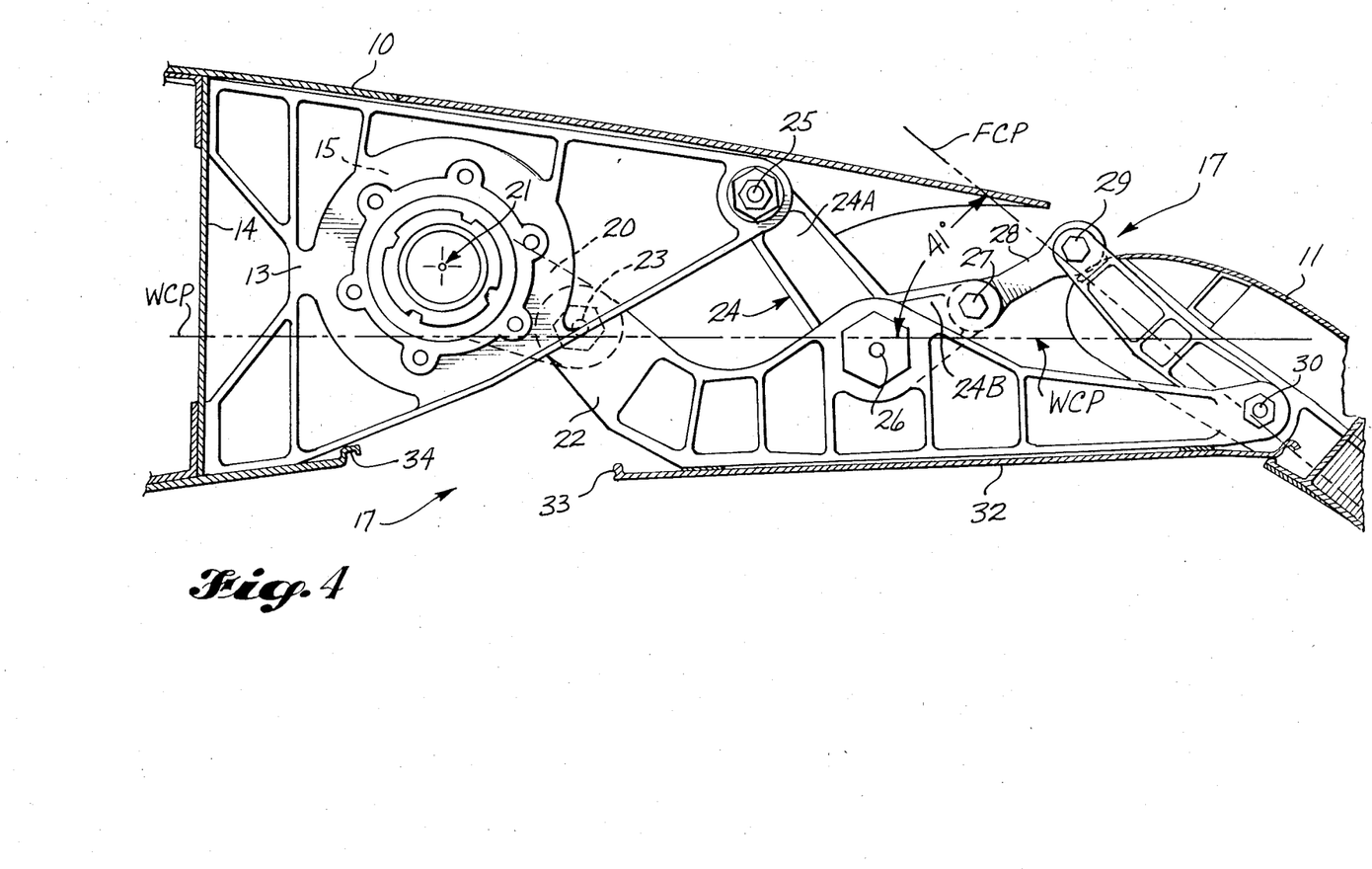
FIG. 4 is a cross-sectional view, similar to the preceding view of FIG. 3, showing the trailing edge flap segment at an extended and deflected position; whereat, an aerodynamic slot is formed between the trailing edge of the fixed wing portion and the leading edge of the extended flap segment.
Figure 5:
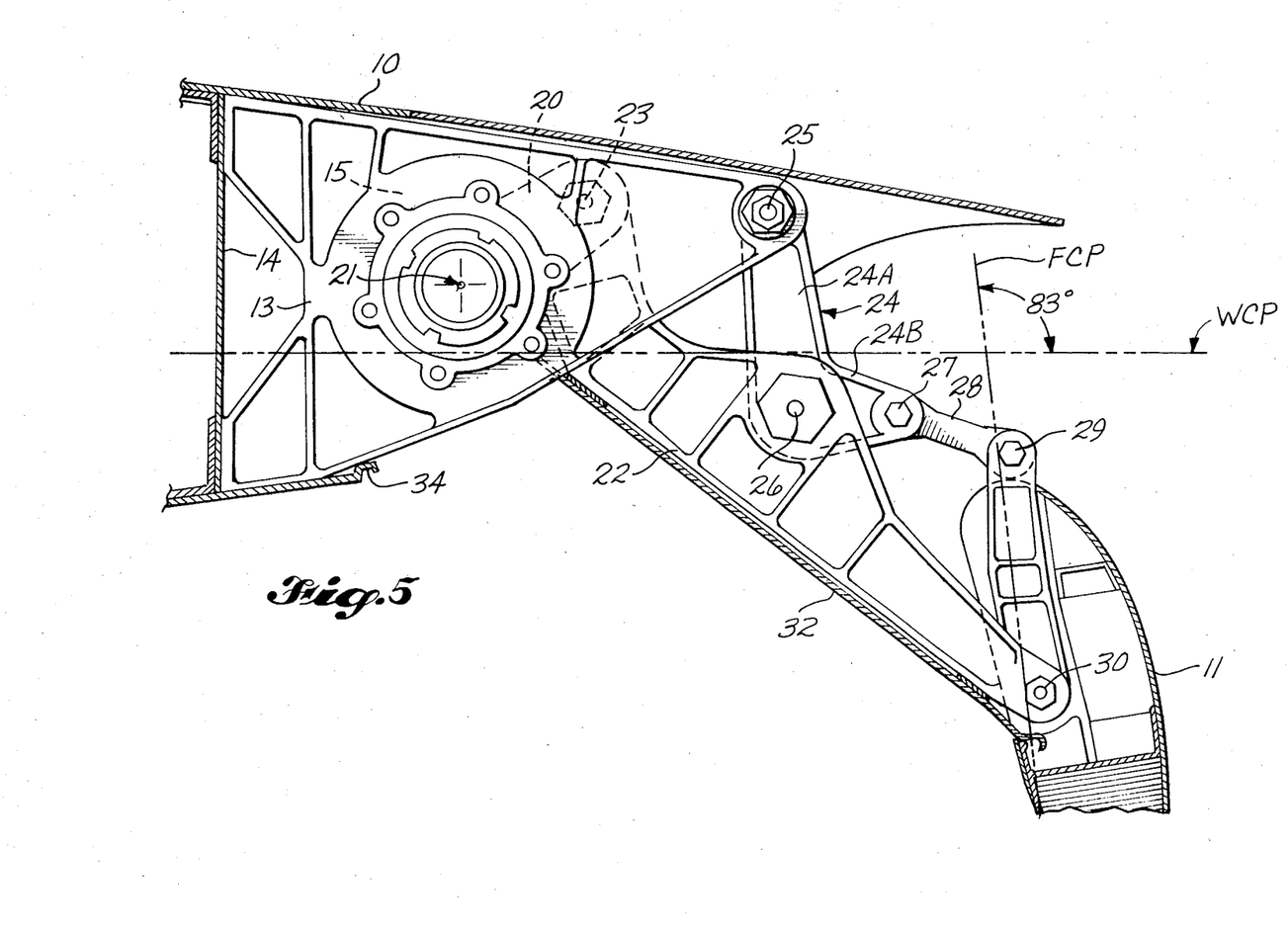
FIG. 5 is a cross-sectional view, similar to the views of FIGS. 3 and 4, showing the trailing edge flap segment at a further deflected position utilized for aerodynamic braking action with the flap chord plane angle at approximately right angles to the wing reference chord plane.

FIGS. 3, 4 and 5 are cross-sectional views taken in the direction indicated by the line 3—3 of FIGS. 1 and 2, and depict a flap extension linkage mechanism and the arrangement of the linkage at different stages of flap operation, i.e.; FIG. 3 shows the flap segment 11 at its stowed or fully retracted stage; FIG. 4 shows the flap segment 11 at an extended and deflected stage whereat an aerodynamic slot 17 is formed; and FIG. 5 shows the flap segment 11 at a further deflected position with the flap chord plane at approximately right angles to the wing chord plane for aerodynamic braking action.

Referring to FIGS. 2 to 4, the fixed portion of the wing comprises a pair of wing ribs 13 that are secured to a spanwise structural member such as a rear wing spar 14. The linkage mechanism for the combined extension and rotation of the flap segment 11, comprises two integrated sets of four-bar linkages which are designed to be symmetrical about the support centerline 18, and arranged in such a way that the first set of four-bar linkages produces a translational movement of the flap segment, and the second set of four-bar linkages produces a rotational movement of the flap segment that functions to change the angle-of-incidence of the flap segment relative to the reference wing chord plane.

The first set of four-bar linkages, which produces flap translation, extends the flap segment 11, shown in FIG. 4 to approximately eight percent of the local wing chord length and comprises: a first bar drive arm 20 powered by a rotary actuator 15 which rotates drive arm 20 about a structurally fixed axis 21; a second bar support beam 22 which is pivotally connected at its forward end at 23 to the drive arm 20; a bellcrank 24 is pivoted at 26 to approximately the mid-length of support beam 22 and one arm 24A of bellcrank 24 constitutes a third bar which is connected at a structurally fixed pivot 25 to a wing rib support 13; and the interconnection of structurally fixed pivots 21 and 25 on the wing rib 13, constitutes a fourth bar of the four-bar linkage.

The second set of four-bar linkages which produces rotational movement of the flap, as shown in FIG. 4, rotates the flap chord plane approximately 40° (forty degrees) relative to the wing chord plane; and comprises: a first bar formed by bellcrank arm 24B; a second bar formed by link 28 which has one end pivotally connected at 27 to bellcrank arm 24B; a third bar is formed by a forward section of the flap having a bracket extending forwardly thereof which is pivotally connected at 29 to the other end of the link 28; and the support beam section between pivots 26 and 30 constitutes a fourth bar of the four-bar flap rotation linkage. The support beam 22 is the main carrier for the flap segment 11 which has an approximate quarter-chord point rotational axis 30 fixed to the aft end of support beam 22 in order that aerodynamic loads act through the quarter-chord point without introducing feedback forces into the linkages.

Figure 8:
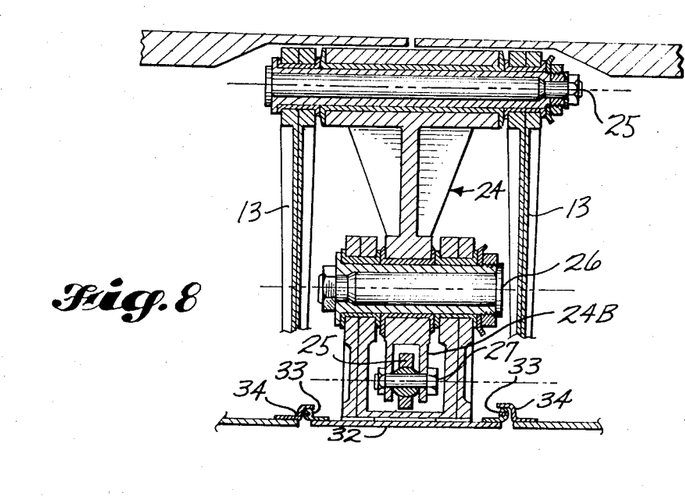
FIG. 8 is a sectional view taken along the line 8—8 of FIG. 3 in the direction indicated.

For structural efficiency, the linkage mechanism for each of the flap carrier units 12, 12A is designed to be symmetrical about the support centerline 18 in order to avoid load offsets which would induce torsion into the linkage mechanism. Referring to FIG. 8, this symmetry is achieved by designing the support beam 22 as a U-shaped channel cross-section into which are positioned drive arm 20, bellcrank 24 and link 28, i.e., the connecting linkage is located within the channel. The channel shape of support beam 22 also provides a stiff and structurally efficient path for the flap side loads.

Figure 7:
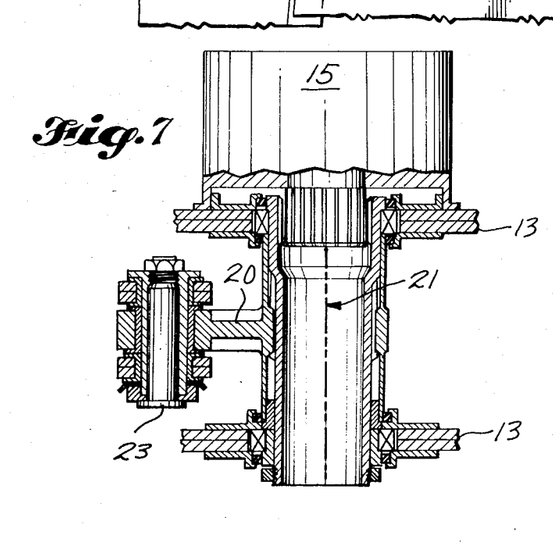
FIG. 7 is a sectional view taken along the line 7—7 of FIG. 3 in the direction indicated.

Also, referring to FIGS. 7 and 8, the ribs 13, drive arm 20, support beam 22, bellcrank 24 and connecting pins at 23, 25 and 26, are all designed as dual or multi-element structural components for fail safety, such that flap segment 11 cannot be separated from the airplane due to only a single structural failure.

In flight operation, for the initial flap segment extension movement from the retracted position shown in FIG. 3 to the extended and deflected position shown in FIG. 4, the rotary actuator 15 rotates drive arm 20 about axis 21 and from the kinematic arrangement of the linkage, results in translating the flap support beam 22 rearwardly approximately eight percent of the local wing chord length (for the kinematics of the linkages depicted), away from the fixed wing trailing edge. The support beam 22 is pivotally connected at 30 to the flap segment 11 at approximately the flap quarter chord point, in order that the aerodynamic loads act directly through, or close to, pivot 30 and the linkage forces are minimized.

By interconnecting the first and second sets of four-bar linkages, through bellcrank 24, there is a simultaneous extension and deflection of the flap segment 11; and the flap segment 11 is kinematically programed to move in a positively controlled manner throughout its complete operating cycle. Further, it will be noted that the angle-of-incidence of the flap chord plane (FCP) relative to the wing chord plane (WCP), is optimized during the flap extension cycle shown in FIGS. 3 to 4, in order to produce the maximum aerodynamic performance for the flap/wing combination.

Referring to FIG. 5, for aerodynamic braking operation, the rotary actuator 15 further rotates drive arm 20 about axis 21 and from the kinematic operation of the linkage, the flap segment 11 is deflected until the flap chord plane is approximately right angles to the wing chord plane.

When the flap segment 11 is in the fully retracted position, as shown in FIGS. 1, 2 and 3 the linkage mechanism is completely housed within the wing airfoil envelope with no external protrusions or fairings and there is also no protrusion of the linkage mechanism through the rear wing spar 14 because the interior of the wing, i.e., between the front and rear spars, is usually a fuel bay area.

Figure 6:
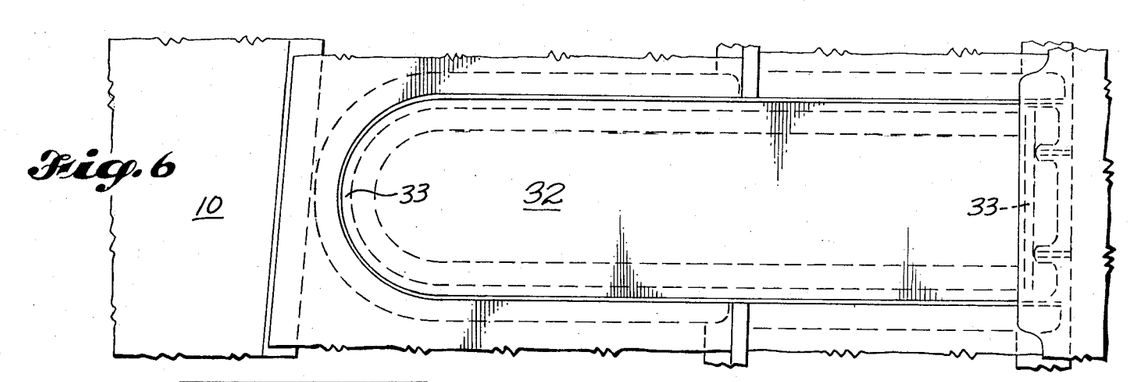
FIG. 6 is a bottom plan view taken in the direction indicated by line 6—6 of FIG. 3 and depicts a cover plate for the linkage mechanism opening in the lower wing surface.

FIG. 6 is a bottom plan view of the wing undersurface at the flap carrier unit location, 12 outboard. At the various flap carrier unit locations spanwise, the fixed wing lower surface is interrupted by an opening which is required for operation of the flap linkage mechanism in order to allow passage through the lower wing skin during flap deployment. For aerodynamic reasons, this region is required to be sealed with the flap retracted; and this sealing or closure of the opening, is achieved by a fairing panel or cover plate 32 attached to the underside of beam member 22. The cover plate 32 has a forward section that is semi-circular in shape and an aft section having straight sides with a squared end. The entire peripheral edge of the cover plate 32, as more clearly shown in the cross-sectional view of FIG. 8, has a seal 33 attached to it and this seal 33 is pressed against a fixed flange 34 rimming the opening in the undersurface of the wing to effectively seal the opening when the flap is fully retracted.

Figures 11, 12:
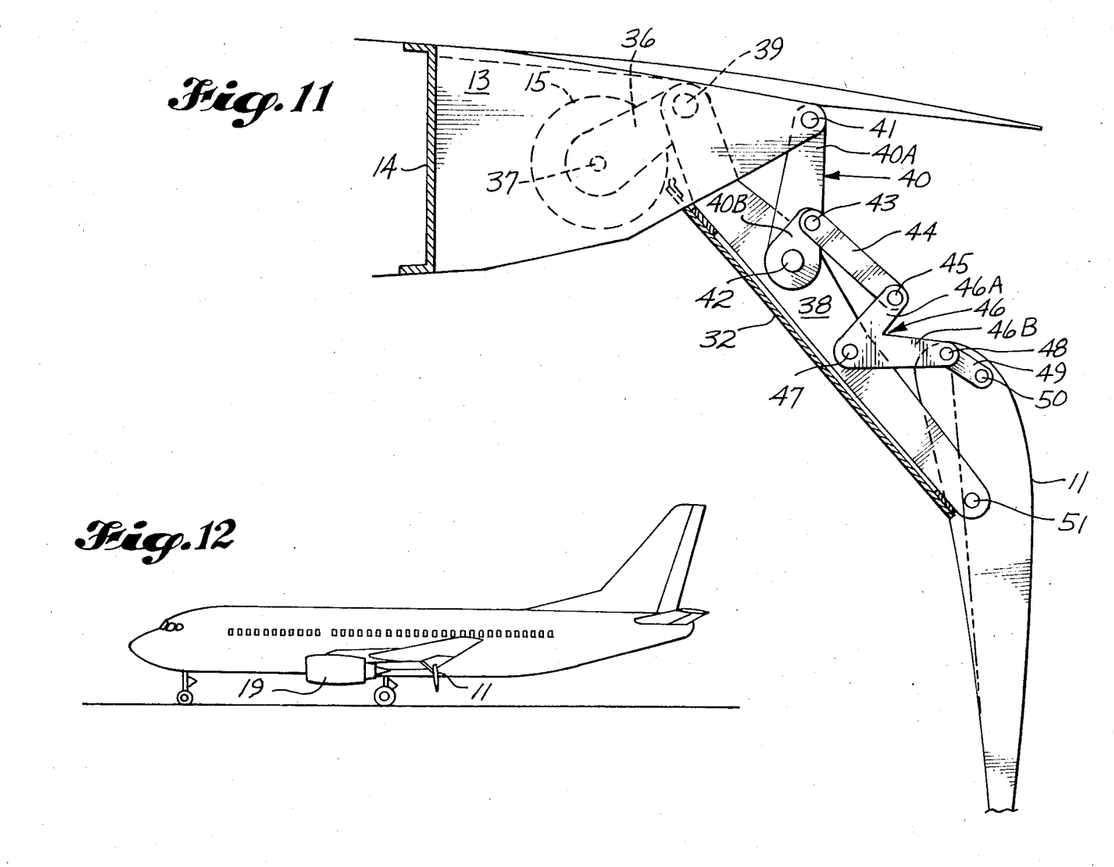
FIG. 11 is a cross-sectional view, similar to the preceding views of FIGS. 9 and 10, showing the trailing edge flap segment at an extended and fully rotated aerodynamic braking position with the flap segment deflected approximately right angles to the wing chord plane.
FIG. 12 is a side elevational view of an airplane having a high bypass turbofan engine pylon mounted from the wing undersurface and a trailing edge flap is shown at approximately right angles to the wing chord plane for aerodynamic braking action and thrust reversal of engine efflux.

Referring to the extended ground position of the flap 11, as shown in FIGS. 5, 11 and 12, the cover plate 32 also serves as a deflector shield, i.e., it serves to deflect runway debris from striking the linkage.

The flap linkage mechanism described supra constitutes a first embodiment that is compatible with a fairly thick wing having a thickness-to-chord ratio greater than 13% and is not considered to be readily applicable to wing sections of lower thickness-to-chord ratios.

Figure 9:
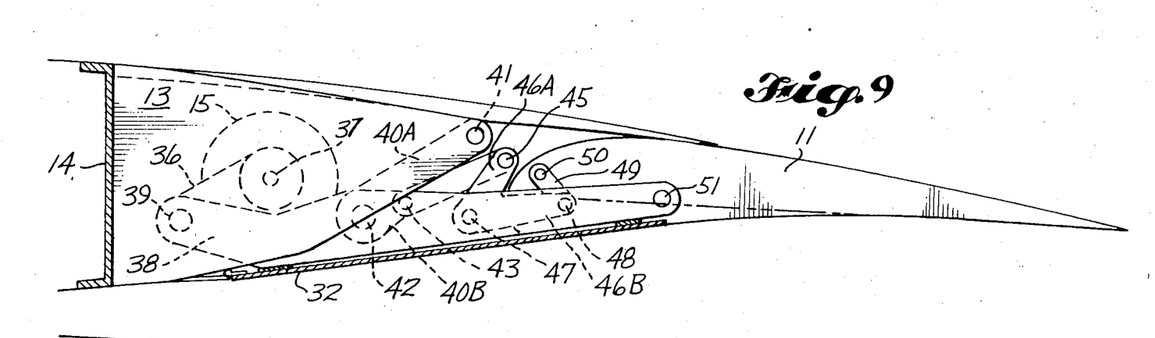
FIG. 9 is a cross-sectional view of a second embodiment of a trailing edge flap segment in a fully retracted and stowed position.
Figure 10:
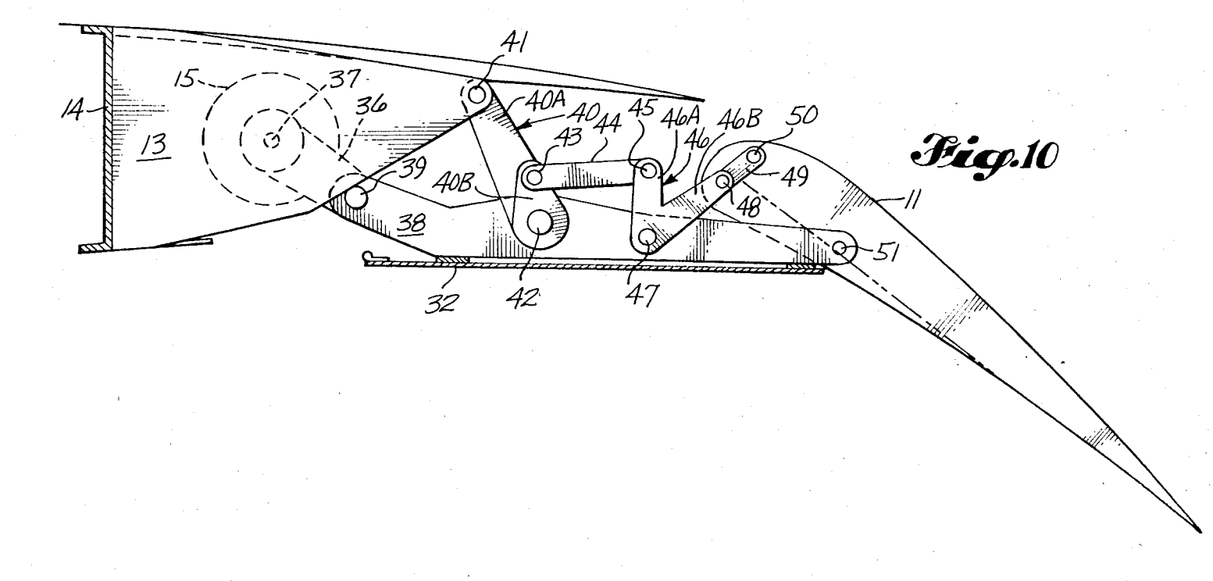
FIG. 10 is a cross-sectional view, similar to the preceding view of FIG. 9, showing the trailing edge flap segment at an extended and deflected position; whereat, an aerodynamic slot is formed.

FIGS. 9, 10 and 11, depict a second embodiment of a flap linkage mechanism that is more compatible with thinner wing airfoil sections i.e., those having a thickness-to-chord ratio of less that 13%, while still retaining the advantages of the first embodiment relative to the absence of protrusions or fairings for minimum aerodynamic cruise drag characteristics. The flap linkage mechanism comprises three integrated sets of four-bar linkages arranged in such a way that a first set of four-bar linkages provides translation of the flap segment 11; a second set of four-bar linkages provides rotation of the flap segment 11; and a third set of four-bar linkages interconnects said first and second sets for integrating the translation and rotation of the flap segment 11.

The first set of four-bar linkages of the second embodiment is similar to the four-bar linkage set of the first embodiment, in that they both provide for translation of the flap segment 11; and the second four-bar linkage set of the second embodiment is similar to the second four-bar linkage set of the first embodiment, in that they both provide for rotation of the flap segment 11. The difference between the two embodiments occurs in the interconnection or the intergration of the translation movement of the flap segment 11 with the rotation or angle-of-incidence change of the flap chord relative to the wing chord plane. In wing sections having a thickness-to-chord ratio of less than 13%, the linkage mechanism for actuating the flap segment requires the full depth of the overall wing airfoil section due to the actuation forces and movements required. For instance, referring to the retracted position of the flap segment 11 shown in FIG. 3, it is evident that with the size of the linkage mechanism remaining the same, the decreasing wing depth or airfoil thickness-to-chord ratio would result in the arm 24B of bellcrank 24, protruding from or penetrating the lower surface of the wing airfoil section. Therefore, in order to retain the advantages of no protrusions or fairings for flap segment actuation of a wing in the 10% thickness-to-chord ratio range, the linkage mechanism of the first embodiment was redesigned to that shown in the second embodiment wherein, an additional set of four-bar linkage was inserted between the two sets of four-bar linkages of the first embodiment.

Referring to FIGS. 9, 10 and 11, the first four-bar linkage set which produces a chordwise translation of the flap segment 11, comprises: a first bar drive arm 36 powered by a rotary actuator 15 which rotates drive arm 36 about a structurally fixed axis 37; a second bar support beam 38 which is pivotally connected at its forward end at 39 to the drive arm 36; a bellcrank 40 is pivoted at 42 to approximately the forward one-third length of support beam 38 and one arm 40A of bellcrank 40 constitutes a third bar which is connected at a structurally fixed pivot 41 to a wing rib support 13; and the interconnection of structurally fixed pivots 37 and 41 on the wing rib 13, constitutes a fourth bar of the four-bar linkage set.

The second four-bar linkage set which produces rotational movement of the flap segment 11, comprises: a bellcrank 46 pivoted at 47 to approximately the forward two-thirds length of support beam 38 and one arm 46B of bellcrank 46 constitutes a first bar of the four-bar flap rotation linkage; a second bar is formed by link 49 which has one end pivotally connected at 48 to bellcrank arm 46B; a third bar is formed by a forward portion of the flap between points 50, 51 and this third bar is pivotally connected at 50 to the other end of link 49; and the support beam section between pivots 51, 47 constitutes a fourth bar of the four-bar flap rotation linkage. The support beam 38 is the main carrier for the flap segment 11 which has its rotational axis 51 fixed to the aft end of support beam 38.

The third four-bar linkage set interconnects the first and second sets for integrating translation with rotation of the flap segment 11; and the third four-bar linkage set comprises: a first bar formed by bellcrank arm 40B; a second bar formed by link 44 which has one end pivotally connected at 43 to bellcrank arm 40B; a third bar formed by bellcrank arm 46A which is pivotally connected at 45 to the other end of link 44; and the support beam section between pivots 42 and 47 constitutes the fourth bar of the third set of interconnecting linkage.

FIG. 12 is a side elevational view of a commercial airline passenger airplane having a high bypass turbofan type engine 19 pylon mounted from the wing undersurface on either side of the fuselage. The wing trailing edge flap 11 is shown in a downward deflected position of approximately a right angle to the chord plane of the wing, similar to the arrangement shown in FIGS. 5 and 11; and this flap position could be utilized for an aerodynamic braking action during landing ground roll-out. Further, with the flap and engine relationship shown, a certain amount of thrust reversal of the engine efflux could also be utilized.

By varying the length of the linkage elements and the relationship between the three sets of four-bar linkage, the desired program of flap translation and rotation can be achieved.

While the invention has been disclosed with reference to preferred embodiments, it is to be understood that those modifications and changes which become obvious to a person skilled in the art to which this invention pertains, as a result of the teachings hereof, are considered to be encompassed by the following claims.

I claim:

1. A carrier unit for chordwise extending and rotatably positioning an auxiliary airfoil mounted adjacent to the trailing edge of a relatively fixed main airfoil of an airplane, comprising: a pair of structural rib members spaced apart spanwise and extending chordwise within said main airfoil; said carrier unit being supportably mounted between said pair of rib members and comprising: three sets of four-bar linkages arranged in a chordwise integrated series relative to said main airfoil; said first set of four-bar linkages being arranged symmetrically about a fore-and-aft support centerline within said carrier unit for producing a chordwise translational movement of said auxiliary airfoil relative to said main airfoil, such that said auxiliary airfoil is extended to provide a substantial aerodynamic slot, for the through flow of air, between the trailing edge of said main airfoil and the leading edge of said auxiliary airfoil; said second set of four-bar linkages being arranged in a fore-and-aft series alignment with said first set of four-bar linkages for producing a rotational movement of said auxiliary airfoil, about a spanwise axis, to change the angle-of-incidence of said auxiliary airfoil relative to said main airfoil; and said third set of four-bar linkages forming a direct interconnection between said first and second sets of four-bar linkages for synchronization of extension actuation in combination with programming control of angle-of-incidence of said auxiliary airfoil relative to said main airfoil, from an undeflected retracted position to an extended position to form an aerodynamic slot and a deflected position whereat said auxiliary airfoil has its chord plane deflection angle increased relative to a chord reference plane of said main airfoil, for takeoff and landing operation of the airplane.

2. The carrier unit for chordwise extending and rotatably positioning an auxiliary airfoil, as set forth in claim 1 wherein: said three sets of four-bar linkages have a geometrical relationship for deflecting said auxiliary airfoil to approximately right angles relative to the main airfoil chord plane for aerodynamic braking action during landing roll-out operation of the airplane.

3. The carrier unit for chordwise extending and rotatably positioning an auxiliary airfoil, as set forth in claim 1, wherein said first set of four-bar linkages comprises: a first-bar drive arm pivotally mounted to a first structurally fixed pivot between said pair of rib members; a rotary actuator mounted externally adjacent to said pair of rib members for rotating said first-bar drive arm about said first structurally fixed pivot; a second-bar support beam extending chordwise rearwardly of said main airfoil and pivotally connected at its forward end to said first-bar drive arm; a third-bar link spaced chordwise aft of said first-bar drive arm and pivotally connected at one end to a second structurally fixed pivot between said pair of rib members, and pivotally connected at the other end to approximately the forward one third section of said second-bar support beam; a fourth-bar being constituted by the interconnection of said first and second structurally fixed pivots of said first-bar drive arm and said third-bar link respectively; and said first-bar drive arm and said third-bar link constituting a pair of approximately parallel links swingable chordwise in a generally parallel relationship for translatably shifting said second-bar support beam and extending said auxiliary airfoil.

4. The carrier unit for chordwise extending and rotatably positioning an auxiliary airfoil, as set forth in claim 3, wherein said second set of four-bar linkages has bar linkages five through eight, comprising: fifth-bar drive arm pivotally connected to approximately the rearward one third-section of said second-bar support beam; sixth-bar link having one end pivotally connected to said fifth-bar drive arm; said auxiliary airfoil being cantilever mounted at approximately its quarter-chord point off the aft end of said second-bar support beam in order that aerodynamic loads act through said quarter-chord point without introducing feedback forces into the linkages; a seventh-bar formed by a forward portion of said auxiliary airfoil from its pivotal connection on said second-bar support beam to a leading edge pivotal connection to the other end of said sixth-bar link; and an eighth-bar formed by the rearward one third section of said support beam between, the pivotal connection of said auxiliary airfoil to said support beam and the pivotal connection of said fifth-bar drive arm to said support beam.

5. The carrier unit for chordwise extending and rotatably positioning an auxiliary airfoil, as set forth in claim 3, further including a cover plate attached to the underside of said second-bar support beam for effectively sealing an opening in the main airfoil undersurface when said auxiliary airfoil is fully retracted, said opening being utilized for throughfare of the carrier unit linkages during auxiliary airfoil extension operation.

6. The carrier unit for chordwise extending and rotatably positioning an auxiliary airfoil, as set forth in claim 4, wherein said means forming a direct interconnection between said first and second sets of four-bar linkages comprises a third set of four-bar linkages having a bar linkages nine through twelve, said third set comprising: a nineth-bar drive arm pivotally connected to approximately the forward one third section of said second-bar support beam in axial alignment with said third-bar link pivot; a tenth-bar link having one end pivotally connected to said nineth-bar drive arm; an eleventh-bar link spaced chordwise aft of said nineth-bar link and pivotally connected at one end to the other end of said tenth-bar link, and pivotally connected at the other end to approximately the rearward one third section of said second-bar support beam in axial alignment with said fifth-bar drive arm pivot; a twelfth-bar being constituted by the approximately one third mid-section of said second-bar support beam between the pivotal connection of said nineth-bar drive arm to said second-bar support beam and the pivotal connection of said eleventh-bar link to said second-bar support beam; and said nineth-bar drive arm and said eleventh-bar link, constituting a pair of approximately parallel links forming a direct interconnection between said third-bar link of said first set of four-bar linkages and said fifth-bar drive arm of said second set of four-bar linkages respectively.

7. A carrier unit for chordwise extending and rotatably positioning an auxiliary airfoil mounted adjacent to the trailing edge of a relatively fixed main airfoil of an airplane, comprising: a pair of structural rib members spaced apart spanwise and extending chordwise within said main airfoil; said carrier unit being supportably mounted between said pair of rib members and comprising multi-sets of four-bar linkages arranged in a chordwise integrated series relative to said main airfoil; a first set of four-bar linkages comprising a first-bar drive arm, a second-bar support beam, a third-bar link, and a fourth-bar; said first-bar drive arm being pivotally mounted to a first structurally fixed pivot between said pair of rib members; a rotary actuator mounted externally adjacent to said pair of rib members for rotating said first-bar drive arm about said first structurally fixed pivot; said second-bar support beam extending chordwise rearwardly of said main airfoil and pivotally connected at its forward end to said first-bar drive arm; said third-bar link spaced chordwise aft of said first-bar drive arm and pivotally connected at one end to a second structurally fixed pivot between said pair of rib members, and pivotally connected at the other end to a point forward of the mid-section of said second-bar support bar; said fourth bar being constituted by the interconnection of said first and second structurally fixed pivots of said first-bar drive arm and said third-bar link respectively; said first-bar drive arm and said third-bar link constituting a pair of approximately parallel links swingable chordwise in a generally parallel relationship for translatably shifting said second-bar support beam;

a second set of four-bar linkages comprising a fifth-bar drive arm, a sixth-bar link, a seventh-bar, and an eighth-bar; said fifth-bar drive arm being pivotally connected to a point aft of the mid-section of said second-bar support beam and spaced chordwise aft of said third-bar link; said sixth-bar link having one end pivotally connected to said fifth-bar drive arm and pivotally connected at the other end to the nose portion of said auxiliary airfoil; said auxiliary airfoil being cantilever mounted at approximately its quarter-chord point off the aft end of said second-bar support beam; said seventh-bar being formed by a forward portion of said auxiliary airfoil from its pivotal connection on said second-bar support beam to the nose portion pivotal connection of said sixth-bar link; said eighth-bar being formed by an aft section of said support beam between, the pivotal connection of said auxiliary airfoil to said support beam and the pivotal connection of said fifth-bar arm to said support beam; a third set of four-bar linkages forming a direct interconnection between said first and second sets of four-bar linkages, and comprising a ninth-bar drive arm, a tenth-bar link, an eleventh-bar link, and a twelfth-bar; said ninth-bar drive arm being pivotally connected to a point forward of the mid-section of said second-bar support beam in axial alignment with said third-bar link pivot; said tenth-bar link having one end pivotally connected to said ninth-bar drive arm; said eleventh-bar link being spaced chordwise aft of said ninth-bar link and pivotally connected at one end to the other end of said tenth-bar link, and pivotally connected at the other end to said second-bar support beam in axial alignment with said fifth-bar drive arm pivot; said twelfth-bar being constituted by a mid-section of said second-bar support beam between the pivotal connection of said ninth-bar drive arm to said second-bar support beam and the pivotal connection of said eleventh-bar link to said second-bar support beam; and said ninth-bar drive arm and said eleventh-bar link, constituting a pair of approximately parallel links forming a direct interconnection between said third-bar link of said first set of four-bar linkages and said fifth-bar drive arm of said second set of four-bar linkages respectively; said first set of four-bar linkages being arranged symmetrically about a fore-and-aft support centerline within said carrier unit for producing a chordwise translational movement of said auxiliary airfoil relative to said main airfoil; said second set of four-bar linkages being arranged in a fore-and-aft series alignment with said first set of four-bar linkages and spaced chordwise aft thereof for producing a rotational movement of said auxiliary airfoil, about a spanwise axis, to change the angle-of-incidence of said auxiliary airfoil relative to said main airfoil; and said third set of four-bar linkages forming a direct interconnection between said first and second sets of four-bar linkages for synchronization of extension actuation in combination with programming control of angle-of-incidence of said auxiliary airfoil relative to said main airfoil, from an undeflected retracted position to an extended position to form an aerodynamic slot and a deflected position whereat said auxiliary airfoil has its chord plane deflection angle increased relative to a chord reference plane of said main airfoil, for takeoff and landing operation of the airplane.

* * * * *